United States Patent
Comparan et al.

(10) Patent No.: US 9,021,237 B2
(45) Date of Patent: Apr. 28, 2015

(54) LOW LATENCY VARIABLE TRANSFER NETWORK COMMUNICATING VARIABLE WRITTEN TO SOURCE PROCESSING CORE VARIABLE REGISTER ALLOCATED TO DESTINATION THREAD TO DESTINATION PROCESSING CORE VARIABLE REGISTER ALLOCATED TO SOURCE THREAD

(75) Inventors: Miguel Comparan, Rochester, MN (US); Russell D. Hoover, Rochester, MN (US); Robert A. Shearer, Rochester, MN (US); Alfred T. Watson, III, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 594 days.

(21) Appl. No.: 13/330,831

(22) Filed: Dec. 20, 2011

(65) Prior Publication Data

US 2013/0159669 A1 Jun. 20, 2013

(51) Int. Cl.
*G06F 9/38* (2006.01)
*G06F 15/173* (2006.01)

(52) U.S. Cl.
CPC ............ *G06F 9/3824* (2013.01); *G06F 15/173* (2013.01); *G06F 9/3851* (2013.01)

(58) Field of Classification Search
CPC ......... G06F 9/54; G06F 9/546; G06F 15/167; G06F 9/544; G06F 15/173; G06F 15/163
USPC .......................... 712/225, 32, E9.024, E9.082
See application file for complete search history.

(56) References Cited

U.S. PATENT DOCUMENTS

| | | | | |
|---|---|---|---|---|
| 6,766,517 | B1 * | 7/2004 | Bernardo | 719/313 |
| 8,307,370 | B2 * | 11/2012 | Park | 718/105 |
| 8,572,628 | B2 * | 10/2013 | Bohrer et al. | 719/313 |
| 2002/0103847 | A1 * | 8/2002 | Potash | 709/107 |
| 2007/0294512 | A1 | 12/2007 | Crutchfield et al. | |
| 2008/0028403 | A1 * | 1/2008 | Hoover et al. | 718/100 |
| 2008/0195851 | A1 | 8/2008 | Hoogerbrugge | |
| 2009/0125907 | A1 | 5/2009 | Wen et al. | |
| 2010/0275208 | A1 | 10/2010 | Carrie | |
| 2011/0113220 | A1 * | 5/2011 | Morishita | 712/30 |

FOREIGN PATENT DOCUMENTS

CN 101957744 A 1/2011
CN 101661386 B 3/2013

OTHER PUBLICATIONS

Harman, N.A.; "Algebraic models of behavior and correctness of SMT an CMT processors"; Journal of Logic & Algebric Programming; vol. 74; No. 1; pp. 32-56; Nov.-Dec. 2007.

(Continued)

*Primary Examiner* — Kenneth Kim
(74) *Attorney, Agent, or Firm* — Wood, Herron & Evans, LLP

(57) ABSTRACT

A method and circuit arrangement utilize a low latency variable transfer network between the register files of multiple processing cores in a multi-core processor chip to support fine grained parallelism of virtual threads across multiple hardware threads. The communication of a variable over the variable transfer network may be initiated by a move from a local register in a register file of a source processing core to a variable register that is allocated to a destination hardware thread in a destination processing core, so that the destination hardware thread can then move the variable from the variable register to a local register in the destination processing core.

23 Claims, 9 Drawing Sheets

(56) References Cited

OTHER PUBLICATIONS

Wang, PH et al.; "Helper Threads via Virtual Multithreading"; IEEE Micro, vol. 24; No. 6; pp. 74-82; Nov.-Dec. 2004.

Gebhart, M. et al.; "Energy-efficient Mechanisms for Managing Thread Context in Throughput Processors"; ISCA'11) 38th Annual International Symposium on Computer Architectures; Jun. 2011.
Hilton, AD.; "Hardware for Exploiting Data Level Parallelism"; www.seas.upem.edu/-adhilton/writeup.pdf; 2005-2006.

* cited by examiner

LOW LATENCY VARIABLE TRANSFER NETWORK COMMUNICATING VARIABLE WRITTEN TO SOURCE PROCESSING CORE VARIABLE REGISTER ALLOCATED TO DESTINATION THREAD TO DESTINATION PROCESSING CORE VARIABLE REGISTER ALLOCATED TO SOURCE THREAD

FIELD OF THE INVENTION

The invention is generally related to data processing, and in particular to processor architectures and multithreading.

BACKGROUND OF THE INVENTION

As semiconductor technology continues to inch closer to practical limitations in terms of increases in clock speed, architects are increasingly focusing on parallelism in processor architectures to obtain performance improvements. At the integrated circuit device, or chip level, multiple processing cores are often disposed on the same chip, functioning in much the same manner as separate processor chips, or to some extent, as completely separate computers. In addition, even within cores, parallelism is employed through the use of multiple execution units that are specialized to handle certain types of operations. Pipelining is also employed in many instances so that certain operations that may take multiple clock cycles to perform are broken up into stages, enabling other operations to be started prior to completion of earlier operations. Multithreading is also employed to enable multiple instruction streams to be processed in parallel, enabling more overall work to performed in any given clock cycle.

The net result of applying the aforementioned techniques is an ability to provide multithreaded processing environment with a pool of hardware threads distributed among one or more processing cores in one or more processor chips and in one or more computers, and capable of processing a plurality of instruction streams in parallel. It is expected that as technology increases, processor architectures will be able to support hundreds or thousands of hardware threads, and when multiple processors are combined into high performance computing systems such as supercomputers and massively parallel computers, a potential exists to support millions of hardware threads.

However, effective parallel processing requires that the software applications that run in a multithreaded processing environment take suitable advantage of multithreading capabilities. Software developers are typically more comfortable with developing single threaded applications since they typically follow the sequences of steps needed to perform desired tasks. Support for multithreading is often not as intuitive, and often requires consideration for minimizing conflicts and dependencies to minimize the frequency that threads may spend waiting for other threads to complete work that they need before they can complete their own work. For example, if one thread needs to calculate an average of some set of values that are being calculated by other threads, that thread will not be able to perform its operation until all of the other threads calculate their respective values. Threads that perform completely independent tasks, on the other hand, typically do not suffer from dependency concerns, so much of the effort associated with developing for multithreaded applications is devoted to breaking tasks up into relatively independent threads so that inter-thread dependencies are minimized.

Given the difficulties associated with developing multithreaded applications, a significant need has existed in the art for techniques for simplifying the development of multithreaded applications. For example, significant efforts have been made to programmatically convert single threaded application code into multithreaded application code during compilation, e.g., using an optimizing compiler. With one methodology, for example, fine grained parallelism is employed to convert in-order code in an instruction stream into multiple, small out-of-order code segments, and instructions are inserted into the instruction streams to pass data between the code segments in the form of variables. One type of instruction is a "put" instruction, which sends a variable to another thread, and another type of instruction is a "get" instruction, which retrieves a variable from another thread. Through the use of these instructions, synchronization between code segments executing on multiple threads can be maintained by stalling a code segment that has issued a get statement for a particular variable until another code segment has issued a corresponding put instruction for that variable.

While the use of put and get instructions can effectively maintain synchronization between dependent code segments executing on different hardware threads, any time that a thread is stalled waiting for a variable from another thread represents lost productivity, so it is desirable to minimize the latency associated with communicating variables between threads.

Therefore, a significant need exists in the art for a manner of efficiently communicating data between multiple threads in a multithreaded processing environment to minimize latencies for inter-thread dependencies.

SUMMARY OF THE INVENTION

The invention addresses these and other problems associated with the prior art by providing a method and circuit arrangement that utilize a low latency variable transfer network between the register files of multiple processing cores in a multi-core processor chip to support fine grained parallelism of virtual threads across multiple hardware threads. In some embodiments of the invention, the communication of a variable over the variable transfer network is initiated by a move from a local register in a register file of a source processing core to a variable register that is allocated to a destination hardware thread in a destination processing core, so that the destination hardware thread can then move the variable from the variable register to a local register in the destination processing core.

Consistent with one aspect of the invention, a variable transfer network is coupled between a plurality of processing cores, where a plurality of hardware threads are disposed in the plurality of processing cores, and where each processing core includes a register file and at least one hardware thread among the plurality of hardware threads. The variable transfer network is configured to communicate a variable between a source hardware thread in a source processing core among the plurality of processing cores and a destination hardware thread in a destination processing core among the plurality of processing cores.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Embodiments consistent with the invention utilize a low latency variable transfer network coupled between the register files of multiple processing cores in a multi-core processor chip to communicate variables between threads in a multi-threaded processing environment. In the embodiments discussed hereinafter, each of a plurality of variable registers, optionally architected into extended register files, are allocated to individual hardware threads among the plurality of hardware threads, such that variable transfer network communicates a variable to a destination processing core in response to storage of the variable in the variable register allocated to that destination hardware thread. In addition, in the hereinafter-described embodiments, the variable registers are architected into the register file of each processing core such that they are accessible in much the same manner as the local registers in the register files, and such that dependency logic disposed within each processing core handles dependencies for both the local registers in the register file and the variable registers.

Other variations and modifications will be apparent to one of ordinary skill in the art. Therefore, the invention is not limited to the specific implementations discussed herein.

Hardware and Software Environment

Figure 1:
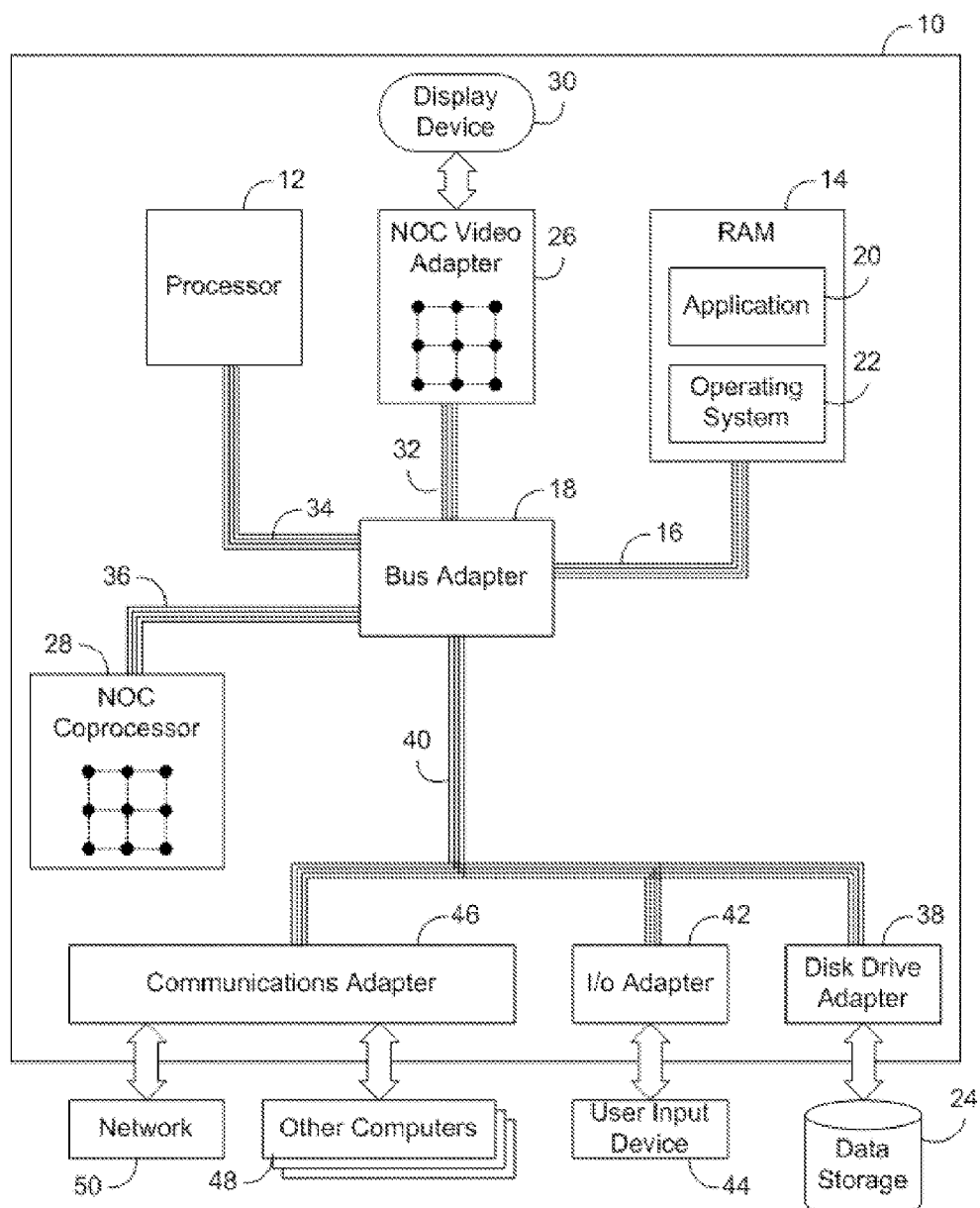
FIG. 1 is a block diagram of exemplary automated computing machinery including an exemplary computer useful in data processing consistent with embodiments of the present invention.

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™ Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
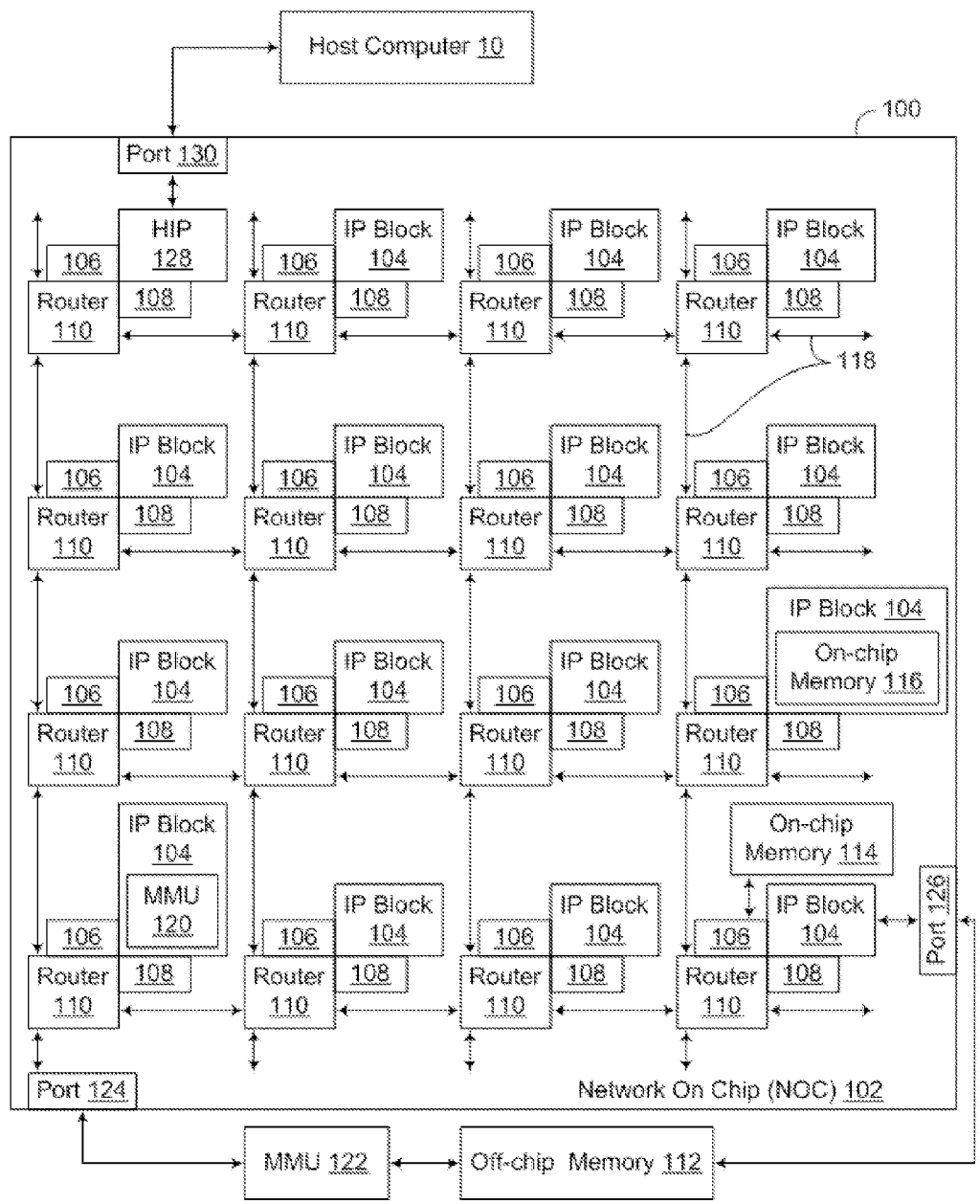
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices, data processing systems utilizing such devices, and other tangible, physical hardware circuits, those of ordinary skill in the art having the benefit of the instant disclosure will appreciate that the invention may also be implemented within a program product, and that the invention applies equally regardless of the particular type of computer readable storage medium being used to distribute the program product. Examples of computer readable storage media include, but are not limited to, physical, recordable type media such as volatile and non-volatile memory devices, floppy disks, hard disk drives, CD-ROMs, and DVDs (among others).

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
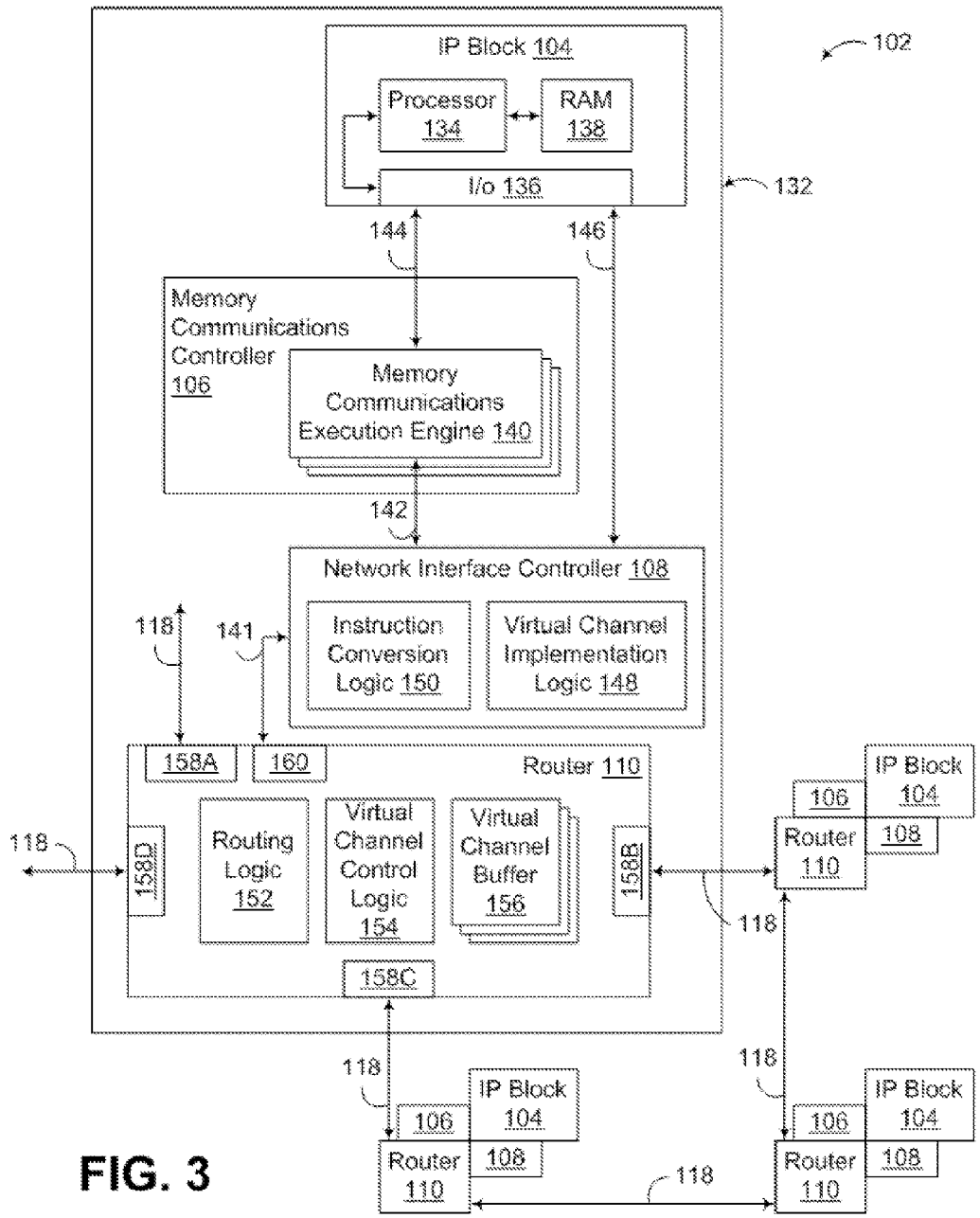
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
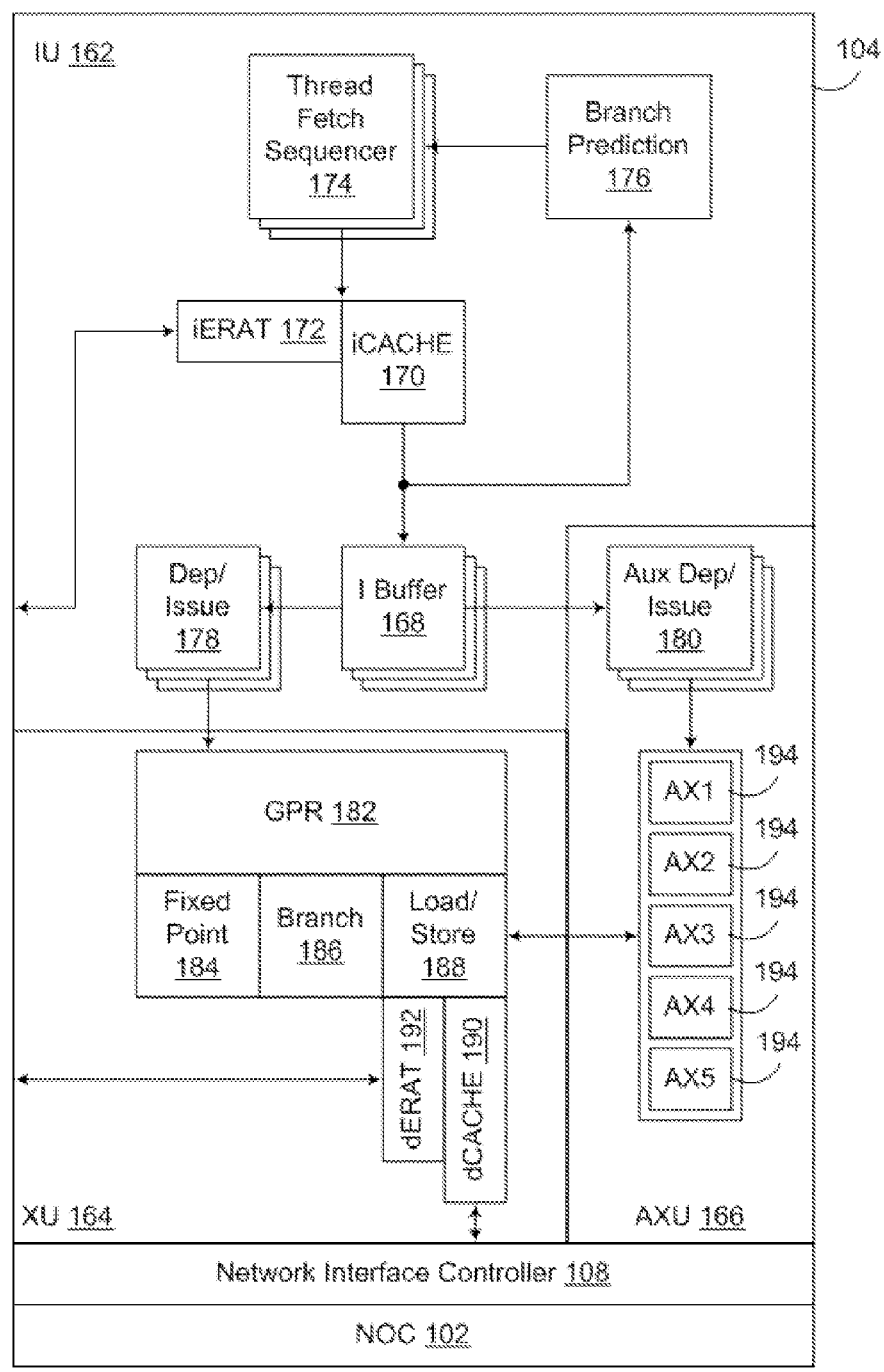
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an issue or instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32b or 64b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Low Latency Variable Transfer Network

Figure 5:
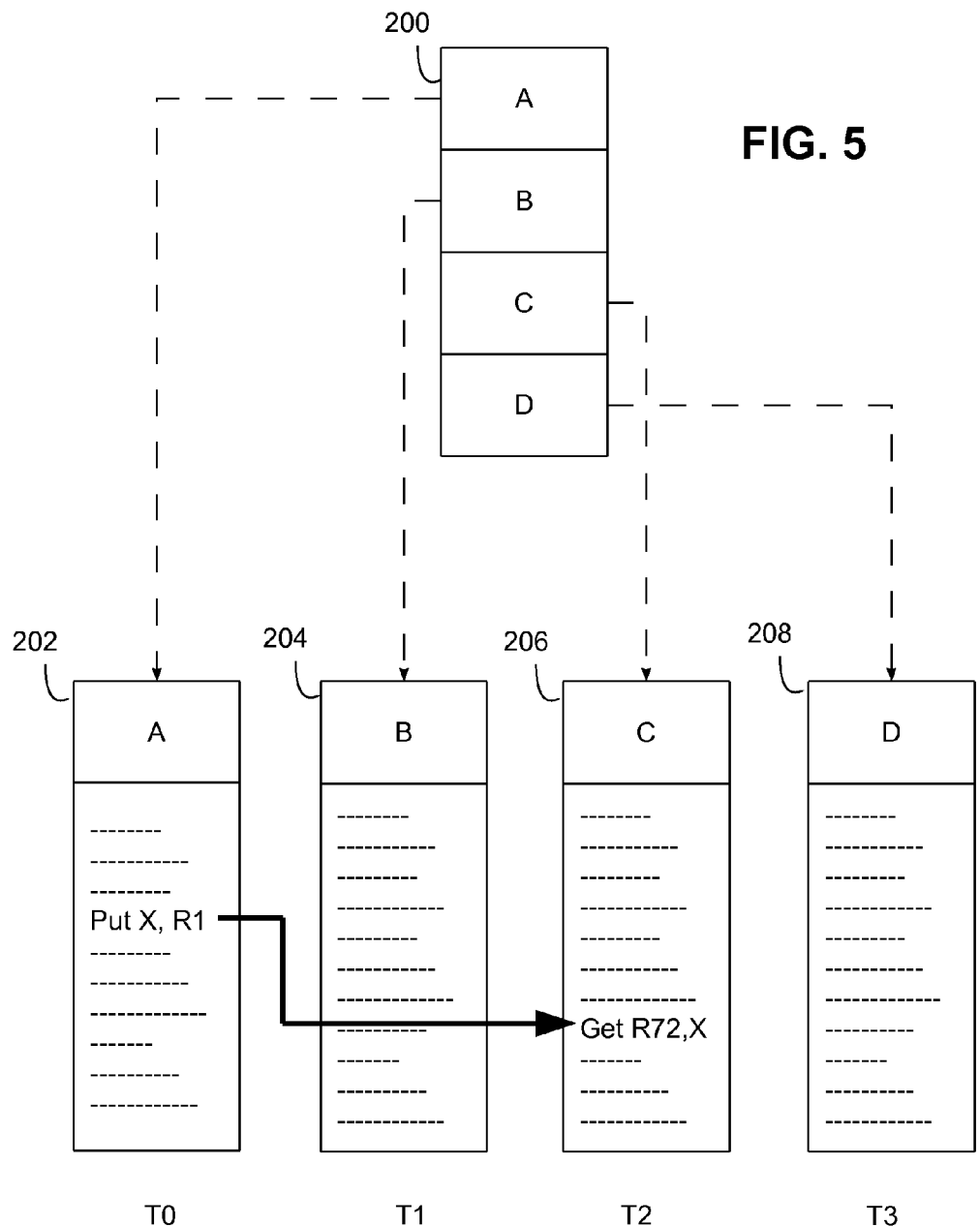
FIG. 5 is a block diagram illustrating fine grained parallelism used to break single threaded code into multiple code segments executable by multiple hardware threads.

Enabling higher single thread code execution performance through enhanced hardware threading has long been a goal in throughput computing. One compiler option to attain this goal is to break single threaded code into many small code segments and execute them in parallel on multiple hardware threads. For example, as illustrated in FIG. 5, single threaded code 200 may potentially be broken up into multiple smaller code segments designated as A-D, and executed respectively in multiple threads T0-T3, as illustrated at 202, 204, 208 and 208.

However, breaking single threaded code into multiple segments often leads to tight interdependencies between hardware threads, resulting in threads being stalled or delayed while waiting for the results of other threads to be completed. For example, in some embodiments consistent with the invention, put and get instructions are inserted into dependent code segments by a compiler in order to transfer data, referred to herein as variables, between code segments running in different threads. FIG. 5, for example, illustrates a put instruction in code segment A running in thread T0 that assigns a value stored in R1 to a variable X, and a get instruction in code segment C running in thread T2 that retrieves the variable X and stores the contents of that variable in register R72.

The speed at which data can be stored in a variable by one thread and then retrieved by another thread can have a significant impact on system performance, and relatively high latency data transfers will necessarily reduce the effectiveness of any parallelization as threads are more frequently stalled waiting for variables to arrive from other threads.

As such, embodiments consistent with the invention facilitate fine grained parallelism by providing a low latency register transfer mechanism, referred to herein as a variable transfer network, between hardware threads to communicate variables between threads disposed in one or more processing cores in a multithreaded processing environment. Among other benefits, embodiments consistent with the invention can enable a single process thread to be spread across multiple threads of execution and extract more performance out of single threaded code.

In the embodiments discussed in greater detail below, a multithreaded processing environment supports a set of instructions in an instruction set architecture that enable low latency variable transfer between hardware threads. In one embodiment, a group of extended register file entries serve as the head of a FIFO used to receive variables sent from other hardware threads. Each FIFO may be as small as one entry, or may include a multitude of entries based on system requirements. Instructions dependent on these registers may then utilize existing dependency checking hardware to enable pipeline level stalls until an input register is available. Dependent instructions therefore wait in an instruction issue queue until a source operand is available. The input register becomes available as soon as it is received from the sending hardware thread, and a credit scheme is desirably used to manage the FIFO such that there are no delays in transmitting a register value when there is a slot available. On the destination hardware thread, the register value is moved to an architected register, clearing the head of the FIFO register and immediately returning a credit to the sending hardware thread to enable the next transfer.

In different embodiments, the extended register entries may be included within fixed point, floating point and/or vector register files enabling up to full vector register variables to be transferred between hardware threads. In other embodiments, however, the FIFO registers may be implemented separately from any register file, so the invention is not so limited.

Figure 6:
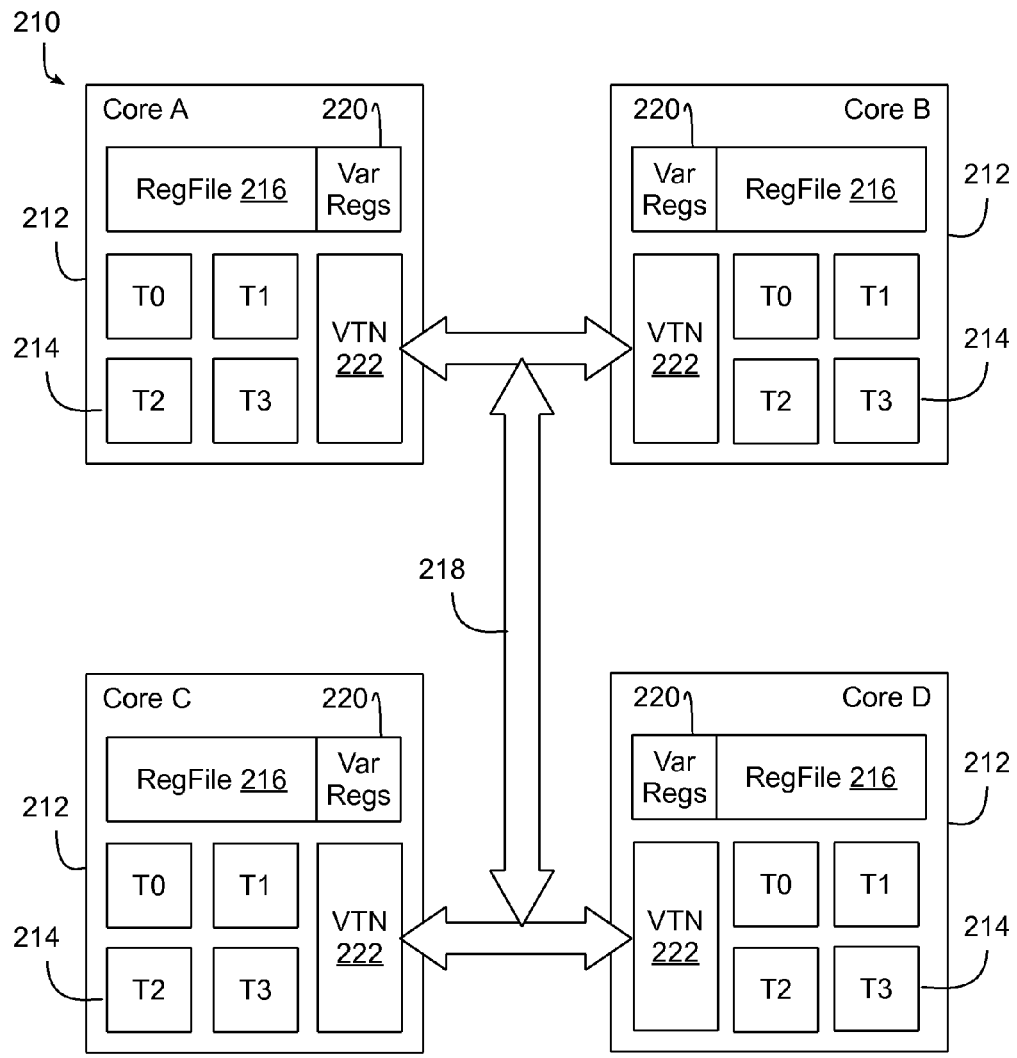
FIG. 6 is a block diagram of an exemplary data processing system including a multi-core processor chip incorporating a low latency variable transfer network consistent with the invention.

FIG. 6, for example, illustrates an exemplary implementation of a multithreaded processing environment, data processing system 210, within which a low latency variable transfer network may be implemented in a manner consistent with the invention. Data processing system 210 is implemented including four processing cores 212 (also designated as Cores A-D), each including four hardware threads 214 (also designated as threads T0-T3) and a common register file 216 shared by threads 214, coupled to one another by a low latency variable transfer network 218. Thus, a total of 16 threads are supported among the four cores 212.

Processing cores 212 are typically disposed on a common integrated circuit device such as a multi-core processor chip, or SOC device, and it will be appreciated that the cores are typically coupled with one another via other communication buses and/or networks (e.g., in a NOC arrangement), and share other components on a chip. However, these additional communication buses, networks and components are omitted from FIG. 6 to simplify the discussion of the invention.

Figure 7:
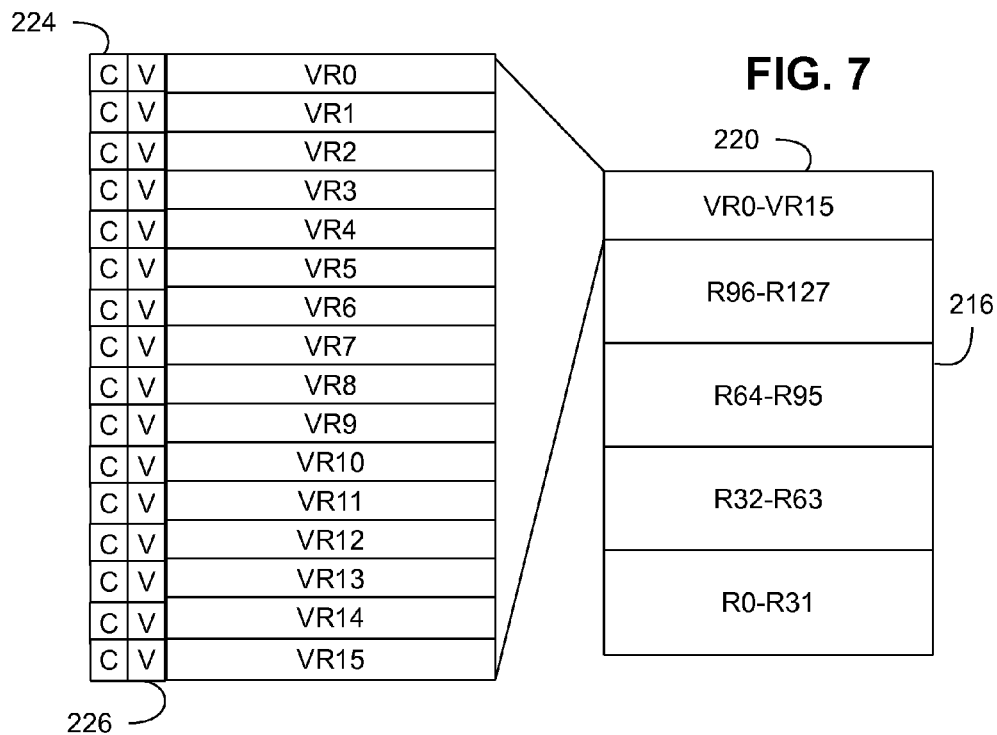
FIG. 7 is a block diagram of an exemplary implementation of the extended register files referenced in FIG. 6.

To implement a low latency variable transfer network in data processing system 210, each processing core includes a plurality of variable registers 220 implemented as extended registers in register file 216, and variable transfer network control logic 222 interfaces these variable registers 220 with variable transfer network 218. For example, as illustrated in FIG. 7, register file 216 may include 128 local registers R0-R127 partitioned into four thread-specific groups, such that each thread T0-T3 is allocated 32 local registers. In addition, register file 216 may be extended with a plurality of variable registers 220, also designated as VR0-VR15, with one variable register allocated or assigned to each individual thread in the data processing system.

In addition, for the purposes of coordinating the transfer of variables between hardware threads, each variable register has an associated credit flag 224 and valid flag 226. Credit flag 224 is used in a credit-based protocol to allow a source thread to communicate new variables to a destination thread only when the source thread has an available credit, while valid flag 226 is used by a source thread to indicate when valid data has been written to the variable register. Valid flag 226 is cleared in response to the destination thread reading the variable and sending a credit back to the source thread.

Figure 8:
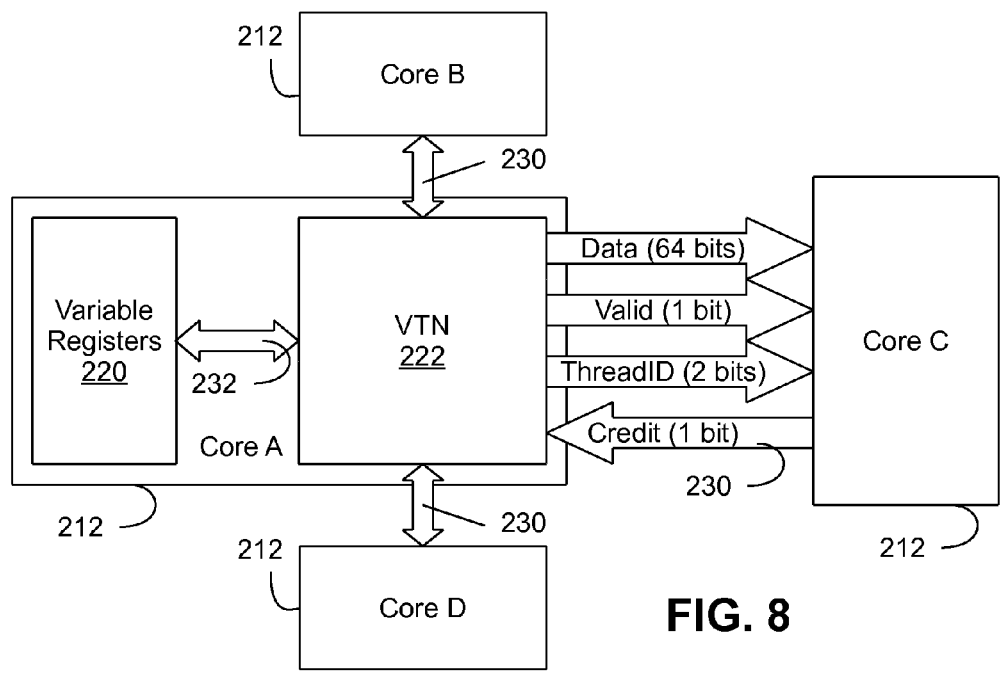
FIG. 8 is a block diagram of an exemplary implementation of a send bus in the variable transfer network referenced in FIG. 6.

The manner in which a variable transfer network is implemented may vary in different embodiments. For example, as illustrated in FIG. 8, a variable transfer network may be implemented by providing, for each core 212, a separate, dedicated send bus 230 to each other core 212. FIG. 8, in particular, illustrates the three dedicated send buses 230 that may be implemented to enable core A to send variables to each of cores B, C and D. It will be appreciated that each other core B, C and D may be provided with its own dedicated send buses, thereby providing a total of 12 send buses, two per pair of cores.

Each send bus 230 is primarily driven by variable transfer network control logic 222 in a sending core, and is coupled to variable registers 220 over an internal core bus 232. To simplify FIG. 8, only send bus 230 from core A to core C is broken out into its individual signal paths, but it will be appreciated that the send buses from core A to core B and from core A to core D will be configured in a similar manner.

In this embodiment, registers in register file 216, including variable registers 220, are 64-bits wide, and as such, a set of 64 data lines are provided in each send bus 230 to communicate the contents of a variable register in the same clock cycle. Coincident with communicating a variable over the data lines, a 1-bit valid signal is asserted, as is a 2-bit thread identifier (ThreadID). A single bit return line is used to return a credit from the destination core to the source core when the variable has been read by a destination thread, and as such, each send bus 230 is implemented with 68 signal paths, with the credit line driven by the destination core and all other lines driven by the source core.

Figure 9:
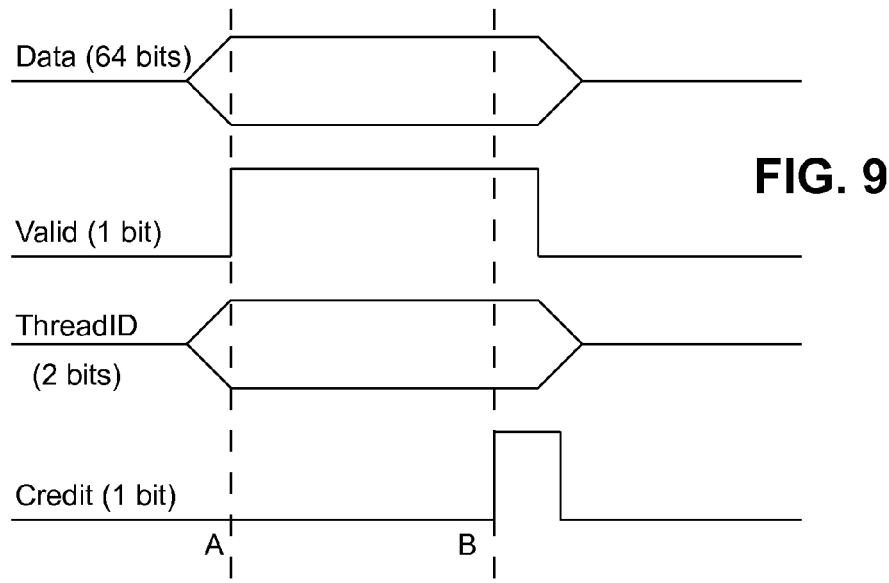
FIG. 9 is a timing diagram illustrating an exemplary variable transmission over the send bus referenced in FIG. 8.

FIG. 9 illustrates a timing diagram of a typical variable transmission over send bus 230, whereby whenever a variable is written to a variable register for a particular destination thread, the valid flag for the variable register is set and the data is asserted on the send bus coupled to the processing core within which the destination thread is resident (time A). In addition, the identifier for the destination thread (T0-T3) is asserted on the ThreadID lines so the data can be routed to the appropriate variable register in the destination processing core. As will be discussed in greater detail below, the data is stored in the variable register and the valid flag in the variable register is set in the destination core.

Sometime thereafter (time B), a destination thread in the destination processing core reads the variable register, which clears the valid flag in the destination core variable register and causes a credit to be returned to the sending processing core, causing the sending processing core to clear the valid bit in the variable register in the sending processing core.

It will also be appreciated that the variable transfer network may also be configured in some embodiments to enable interthread communication of variables between threads on the same processing core, utilizing the same protocol as used to communicate between different processing cores, or even to enable a thread to send a variable to itself, if desired in some embodiments.

Figure 10:
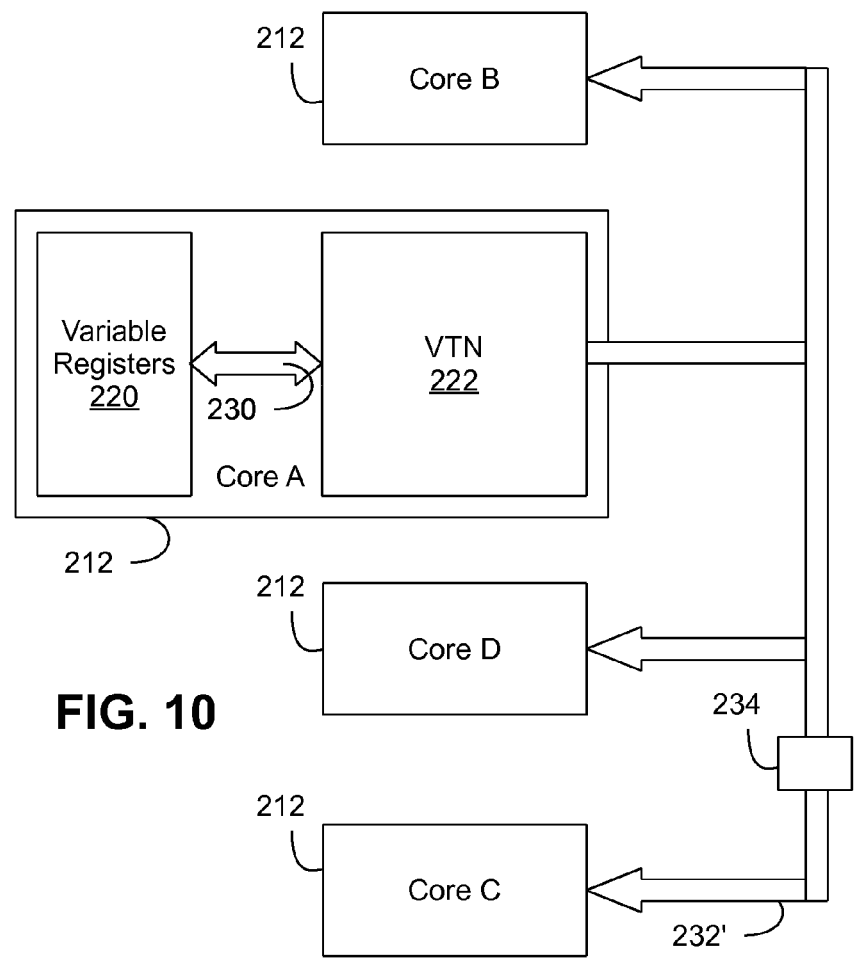
FIG. 10 is a block diagram of an alternate implementation of a send bus to that illustrated in FIG. 8.

The use of separate send buses from each processing core to each of the other processing cores enables very low latency operations with minimal chances of conflicts between threads. Other implementations, however, may be used in other embodiments. For example, FIG. 10 illustrates an alternate implementation where rather than utilizing separate send buses to each processing core, a single send bus 232' is provided for each processing core 212 to the other three processing cores. Thus, while FIG. 10 only illustrates a single send bus 232' for core A, it will be appreciated that each of cores B-D will include its own send bus 232', for a total of four buses. Send bus 232' may be configured similarly to send bus 232, but with the addition of two CoreID lines that encode a destination core for a variable, so that all three processing cores snoop each variable communicated over the send bus 232', but only the processing core with the destination thread participates in the protocol. In this regard, the four CoreID and ThreadID lines collectively identify a single one of the 16 hardware threads.

Other network communications may be used in other embodiments of the invention. For example, it may be desirable in some implementations to incorporate one or more buffers, e.g., buffer 234, as may be necessary for longer interconnects between processing cores to account for signal propagation delays. Nonetheless, with the protocol disclosed herein, the sending and receiving of variables are handled asynchronously, so the addition of one or more buffers, while increasing the latency of the transmissions, will nonetheless not affect the transmission protocol. In addition, it will be appreciated that for inter-thread variable transmissions between threads in the same processing core may utilize an optimized protocol that does not rely on the protocol that may be required for inter-core transmissions due to the substantially shorter lengths of the signal paths within a core compared to those required to communicate between cores. Moreover, in some implementations, each thread may have a dedicated send bus to every other unique thread participating in the variable transfer network, which would eliminate the need for ThreadID or CoreID lines altogether.

It may also be desirable in some embodiments to utilize narrower buses in order to reduce the number of signal paths in a variable transfer network. For example, for 64-bit variables, the variables may be broken into 32-bit, 16-bit or 8-bit pieces that are communicated over 2, 4 or 8 cycles. Alternatively, a serial transmission protocol may be used. In each of these variations, fewer signal paths are required, but at the cost of increased latency, which may be undesirable in applications where the smallest latency is desired in order to maximize performance.

Figure 11:
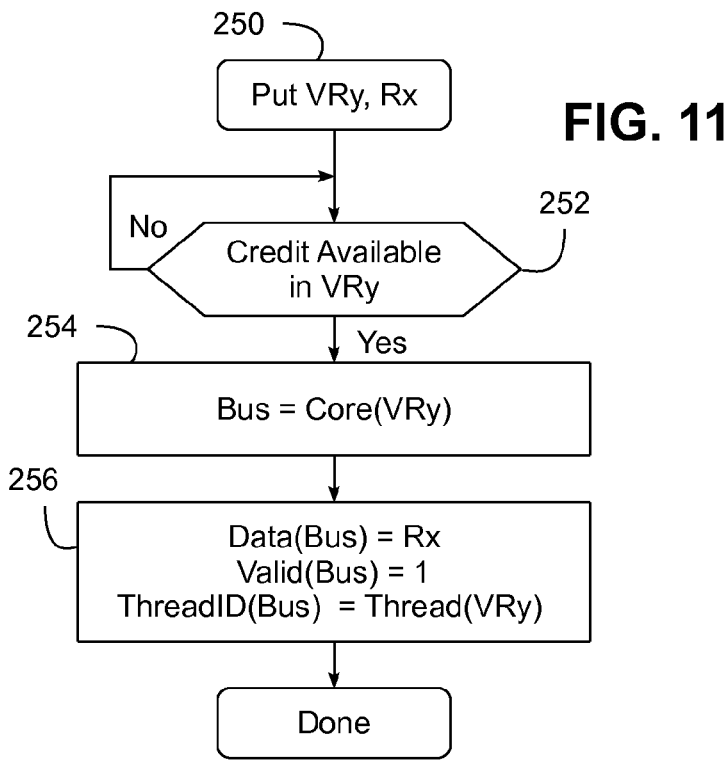
FIG. 11 is a flowchart illustrating an exemplary sequence of operations performed when executing a put instruction to send a variable over the variable transfer network in the multi-core processor chip of FIG. 6.
Figure 12:
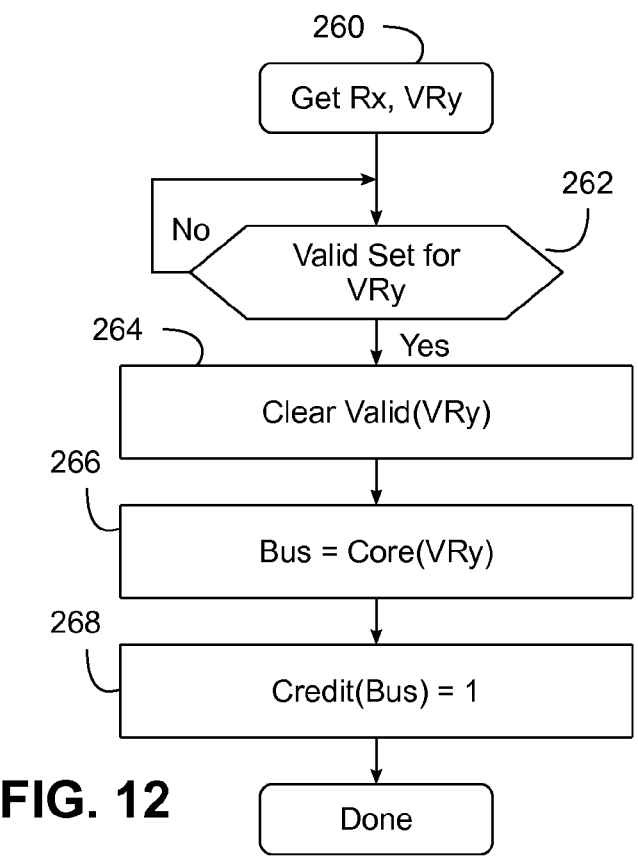
FIG. 12 is a flowchart illustrating an exemplary sequence of operations performed when executing a get instruction to receive a variable from the variable transfer network in the multi-core processor chip of FIG. 6.

FIGS. 11 and 12 next illustrate exemplary put and get instructions that may utilize a low latency variable transfer network consistent with the invention. A put instruction (put VRy, Rx, which is executed by a source thread to send the value stored in local register Rx to variable register VRy for a destination thread y) is handled as illustrated at 250 in FIG. 11 by first checking the credit flag in the variable register VRy for destination thread y in block 252 to determine if a credit is available for the register. If not, the source thread stalls using conventional dependency logic until a credit becomes available.

If a credit is available, however, control passes to block 254 to select the send bus for the core in which the destination thread is resident, and then to block 256 to move the contents of register Rx to the send bus, asserting the value stored in register Rx on the data lines, asserting the valid line on the send bus, and asserting the identifier of the destination thread within the destination core on the ThreadiD lines of the send bus. Once this data has been asserted on the send bus, the sending thread is then free to proceed with executing subsequent instructions in an instruction stream.

A get instruction (get Rx, VRy, which is executed by a destination thread to move a variable stored in a source thread y's variable register into a local register Rx) is handled as illustrated at 260 in FIG. 12 by first checking the valid flag in the variable register VRy in block 262 to determine if valid data is stored in the variable register. If not, the destination thread stalls using conventional dependency logic until valid data is indicated in the variable register.

If valid data is stored in the variable register, however, control passes to block 264 to clear the valid flag in the variable register, and then to block 266 to select the send bus for the core in which the source thread is resident. Next, a credit is returned over the send bus in block 268 to notify the source core that the variable has been read. Once the credit has been asserted on the send bus, the destination thread is then free to proceed with executing subsequent instructions in an instruction stream.

It will be appreciated that with the put and get instructions illustrated in FIGS. 11-12, the variable transfer network is configured such that the put instruction in the source thread moves to the variable register associated with the destination thread, but the data is presented to the destination thread in the variable register associated with the source thread so that the get instruction in the destination thread moves from the variable register associated with the source thread, and not its own.

Thus, for example, if it was desired to move data stored in a local register R1 on one processing core using thread 0 running on that processing core to a local register R29 on another processing core for access by thread 1 on that other processing core (globally identified as thread 13), thread 0 would typically perform a "put VR13, R1" operation to move the contents of its local register R1 to variable register VR13 for thread 13. Thread 13 on the other processing core would then typically perform a "get R29, VR0" operation to move the contents of the variable register VR0 for thread 0 to its local register R29.

In the illustrated embodiment, the put and get instructions are typically incorporated into one or more instruction streams of an application by an optimizing compiler, e.g., during development and compilation of the application. As noted above, the instructions may be used in connection with parallelizing single threaded code into multiple virtual threads. It should be appreciated that during compilation, it would typically be desirable for a compiler to co-locate virtual threads that frequently pass variables between one another on the same processing core whenever possible to minimize latencies. Furthermore, if latencies vary between different processing cores, e.g., due to the insertion of buffers into the variable transfer network to handle longer paths between cores that are distant from one another on the same processor chip, or when some processing cores may be disposed on different chips, a compiler may take that into account when assigning virtual threads to processing cores.

It will also be appreciated that variable transfer networks consistent with the invention need not be used in connection with compiler thread virtualization, and may find utility in other applications requiring low latency inter-thread communications.

As noted above, each variable register in the illustrated embodiment functions as the head of a single entry queue or FIFO data structure, much like an inbox for its associated hardware thread. It will be appreciated, however, that a variable register may be implemented using a multi-entry queue or FIFO, and that a credit-based protocol may grant multiple credits to source threads to permit multiple variables to be buffered for subsequent consumption by destination threads.

In addition, each variable register in the illustrated embodiment is accessible in much the same manner as the other registers in a register file, and is coupled to the existing dependency logic of each processing core so that the existing dependency logic may be leveraged to synchronize the access to variable registers in the same manner in which inter-instruction latencies are synchronized.

It will be appreciated that in various embodiments, variable registers may be incorporated into different register files and utilized by different execution units, e.g., so that a low latency variable transfer network is implemented only for fixed point execution units, floating point execution units, scalar execution units, vector execution units and/or various combinations thereof.

Furthermore, although the illustrated embodiments disclose a processor chip with 16 threads distributed in groups of four between four processing cores, it will be appreciated that the invention may be utilized in connection with any number of threads and any number of processing cores. In addition, it will be appreciated that other synchronization, queuing and/or handshake protocols may be used as an alternative to the credit-based single entry queue protocol disclosed herein, and that other network topologies may be used beyond those disclosed herein. Therefore, the invention is not limited to the particular implementation details disclosed herein.

In addition, it will be appreciated that while a variable register is fully architected in every core for every hardware thread that participates in a variable transfer network, embodiments consistent with the invention need not implement full logic circuits for each register within every core. For example, shared buffers functioning as shared inboxes/outboxes may be used in some embodiments to temporarily store variables before they are passed to local registers in a register file, thereby avoiding the need to allocate storage for every variable register in every core. Also, it may be desirable to allow threads to send data to their allocated variable registers. Doing so would effectively provide each thread with its own scratch register. In addition, it may be desirable in some embodiments to omit variable registers for local threads within a given core, or to omit valid or credit indicators in some implementations. It may also be desirable in some embodiments to implement credit and/or valid indicators in different data structures than directly within the variable registers. In addition, in some embodiments, only a subset of the threads in each processing core may support a variable transfer network, which may enable the logic circuitry required to implement a variable transfer network to be reduced, while allowing any workloads that require variable transfers to be executed on those threads, with other workloads that do not require variable transfers to execute on other threads.

Various additional modifications may be made to the disclosed embodiments without departing from the spirit and scope of the invention. Therefore, the invention lies in the claims hereinafter appended.

What is claimed is:

1. A circuit arrangement, comprising:
a plurality of hardware threads disposed in a plurality of processing cores, each processing core including a register file and at least one hardware thread among the plurality of hardware threads, the register file in each processing core including a plurality of local registers; and
a variable transfer network coupled between the plurality of processing cores, the variable transfer network configured to communicate a variable between a source hardware thread in a source processing core among the plurality of processing cores and a destination hardware thread in a destination processing core among the plurality of processing cores; and a plurality of variable registers, each variable register allocated to an individual hardware thread among the plurality of hardware threads, wherein the variable transfer network is configured to communicate the variable to a variable register allocated to the source hardware thread in the destination processing core in response to the source hardware thread in the source processing core writing to the variable register allocated to the destination hardware thread in the source processing core.

2. The circuit arrangement of claim 1, wherein the plurality of variable registers are architected into the register file of each processing core, and wherein dependency logic disposed within each processing core handles dependencies for both the plurality of local registers in the register file and the plurality of variable registers.

3. The circuit arrangement of claim 1, wherein the variable transfer network is configured to communicate the variable to the destination processing core in response to an instruction executed by the source hardware thread.

4. The circuit arrangement of claim 3, wherein the instruction comprises a put instruction that moves the variable from a local register among the plurality of local registers in the register file of the source processing core to the variable register allocated to the destination hardware thread in the source processing core.

5. The circuit arrangement of claim 4, wherein the variable register allocated to the destination hardware thread in the source processing core includes a credit flag that indicates whether the destination hardware thread is ready to receive a variable over the variable transfer network, and wherein the source processing core is configured to stall the put instruction until the credit flag indicates that the destination hardware thread is ready to receive a variable.

6. The circuit arrangement of claim 1, wherein the variable transfer network is configured to present the variable at the variable register allocated to the source hardware thread in the destination processing core in response to the source hardware thread in the source processing core writing to the variable register allocated to the destination hardware thread in the source processing core, wherein the destination hardware thread is configured to move the variable from the variable register allocated to the source hardware thread in the destination processing core to a local register among the plurality of local registers in the register file of the destination processing core in response to an instruction executed by the destination hardware thread.

7. The circuit arrangement of claim 6, wherein the instruction comprises a get instruction, wherein the variable register allocated to the source hardware thread in the destination processing core includes a valid flag that indicates whether valid data is stored in the variable register allocated to the source hardware thread in the destination processing core, and wherein the destination processing core is configured to stall the get instruction until the valid flag indicates that valid data is stored in the variable register allocated to the source hardware thread in the destination processing core.

8. The circuit arrangement of claim 6, wherein the destination processing core is configured to return a credit over the variable transfer network in response to moving the variable from the variable register allocated to the source hardware thread in the destination processing core to a local register among the plurality of local registers in the register file of the destination processing core.

9. The circuit arrangement of claim 1, wherein the variable transfer network comprises a send bus coupled between the source processing core and the destination processing core, the send bus including a plurality of data lines configured to communicate the variable, at least one thread identifier line configured to communicate an identifier for the destination hardware thread, and a valid line configured to indicate when valid data is being communicated over the plurality of data lines.

10. The circuit arrangement of claim 9, wherein each of the data, thread identifier and valid lines are driven by the source processing core, and wherein the send bus further includes a credit line driven by the destination processing core and configured to return a credit to the source processing core in response to a successful transfer of the variable by the destination hardware thread.

11. The circuit arrangement of claim 9, wherein the send bus comprises a dedicated bus from the source processing core to the destination processing core, and wherein the variable transfer network comprises a plurality of send buses such that each of the plurality of processing cores includes dedicated buses to each other processing core among the plurality of processing cores.

12. The circuit arrangement of claim 9, wherein the send bus is coupled from the source processing core to each other processing core among the plurality of processing cores, and wherein the send bus further includes at least one core identifier line configured to communicate an identifier for the destination processing core.

13. An integrated circuit device including the circuit arrangement of claim 1.

14. A program product comprising a computer readable medium and logic definition program code stored on the computer readable medium and defining the circuit arrangement of claim 1.

15. A method of communicating variables between a plurality of hardware threads disposed in a plurality of processing cores, each processing core including a register file and at least one hardware thread among the plurality of hardware threads, the register file in each processing core including a plurality of local registers, the method comprising:

with a source hardware thread in a source processing core among the plurality of processing cores, initiating a transfer of a variable to a destination hardware thread in a destination processing core among the plurality of processing cores; and in response to initiating the transfer of the variable, communicating the variable from the source processing core to a variable register allocated to the source hardware thread in the destination processing core over a variable transfer network coupled to the source and destination processing cores;

wherein initiating the transfer of the variable comprises writing to a variable register allocated to the destination hardware thread in the source processing core with the source hardware thread in the source processing core, wherein the variable register is among a plurality of variable registers disposed on the multi-core processing chip, and wherein each variable register is allocated to an individual hardware thread among the plurality of hardware threads.

16. The method of claim 15, wherein the plurality of variable registers are architected into the register file of each processing core, and wherein dependency logic disposed within each processing core handles dependencies for both the plurality of local registers in the register file and the plurality of variable registers.

17. The method of claim 15, wherein initiating the transfer of the variable includes executing a put instruction with the source hardware thread, wherein the put instruction that moves the variable from a local register among the plurality of local registers in the register file of the source processing core to the variable register allocated to the destination hardware thread in the source processing core.

18. The method of claim 17, wherein the variable register allocated to the destination hardware thread in the source processing core includes a credit flag that indicates whether the destination hardware thread is ready to receive a variable over the variable transfer network, and wherein the method further comprises stalling the put instruction until the credit flag indicates that the destination hardware thread is ready to receive a variable.

19. The method of claim 18, wherein the variable transfer network is configured to present the variable at the variable register allocated to the source hardware thread in the destination processing core in response to the source hardware thread in the source processing core writing to the variable register allocated to the destination hardware thread in the source processing core, the method further comprising moving the variable from the variable register allocated to the source thread in the destination processing core to a local register among the plurality of local registers in the register file of the destination processing core in response to a get instruction executed by the destination hardware thread, wherein the variable register allocated to the source thread in the destination processing core includes a valid flag that indicates whether valid data is stored in the variable register allocated to the source thread in the destination processing core, and wherein the method further comprises stalling the get instruction until the valid flag indicates that valid data is stored in the variable register allocated to the source thread in the destination processing core.

20. The method of claim 19, further comprising returning a credit over the variable transfer network in response to moving the variable from the variable register allocated to the source thread in the destination processing core to a local register among the plurality of local registers in the register file of the destination processing core.

21. The method of claim 15, wherein the variable transfer network comprises a send bus coupled between the source processing core and the destination processing core, the send bus including a plurality of data lines configured to communicate the variable, at least one thread identifier line configured to communicate an identifier for the destination hardware thread, and a valid line configured to indicate when valid data is being communicated over the plurality of data lines, wherein each of the data, thread identifier and valid lines are driven by the source processing core, and wherein the send bus further includes a credit line driven by the destination processing core and configured to return a credit to the source processing core in response to a successful transfer of the variable to the destination hardware thread.

22. The method of claim 21, wherein the send bus comprises a dedicated bus from the source processing core to the destination processing core, and wherein the variable transfer network comprises a plurality of send buses such that each of the plurality of processing cores includes dedicated buses to each other processing core among the plurality of processing cores.

23. The method of claim 21, wherein the send bus is coupled from the source processing core to each other processing core among the plurality of processing cores, and wherein the send bus further includes at least one core identifier line configured to communicate an identifier for the destination processing core.

* * * * *